Figure 18:
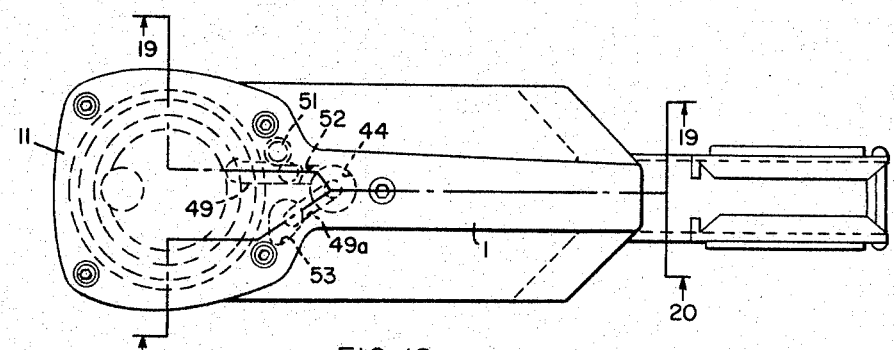

Sept. 19, 1967  W. SCHAFROTH ETAL  3,342,110
NAILING MACHINE
Filed Sept. 25, 1964  7 Sheets-Sheet 1
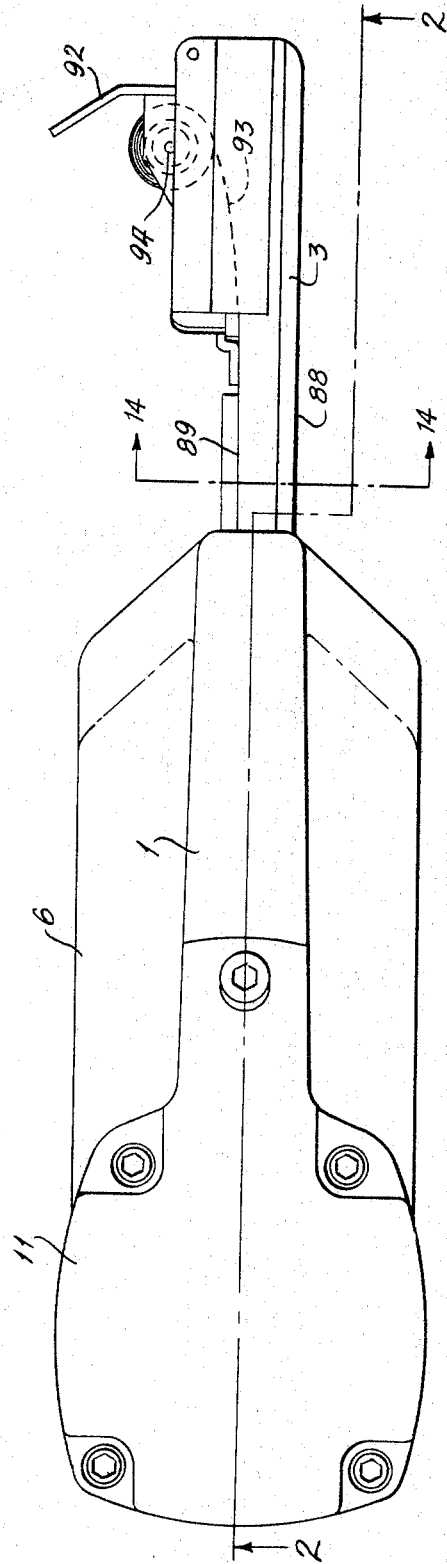
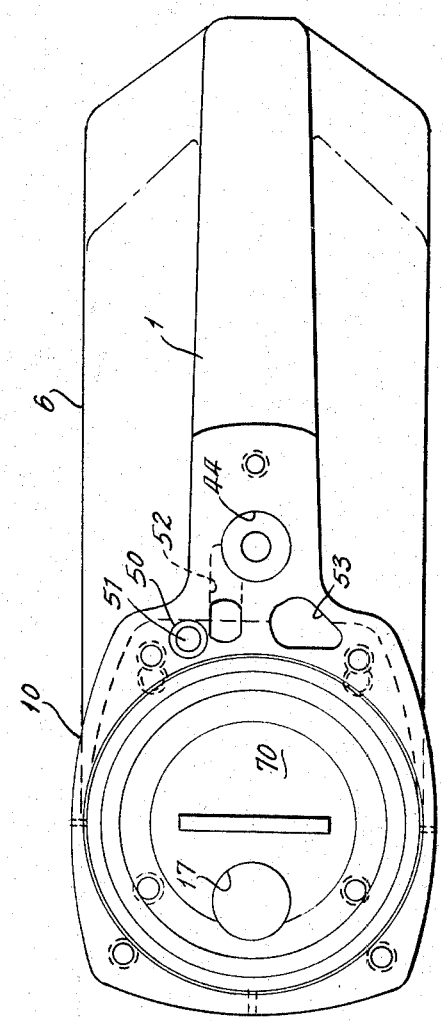
INVENTORS:
WERNER SCHAFROTH
ANTHONY E. CAIRATTI
BY Gravely, Lieder & Woodruff
ATTORNEYS.

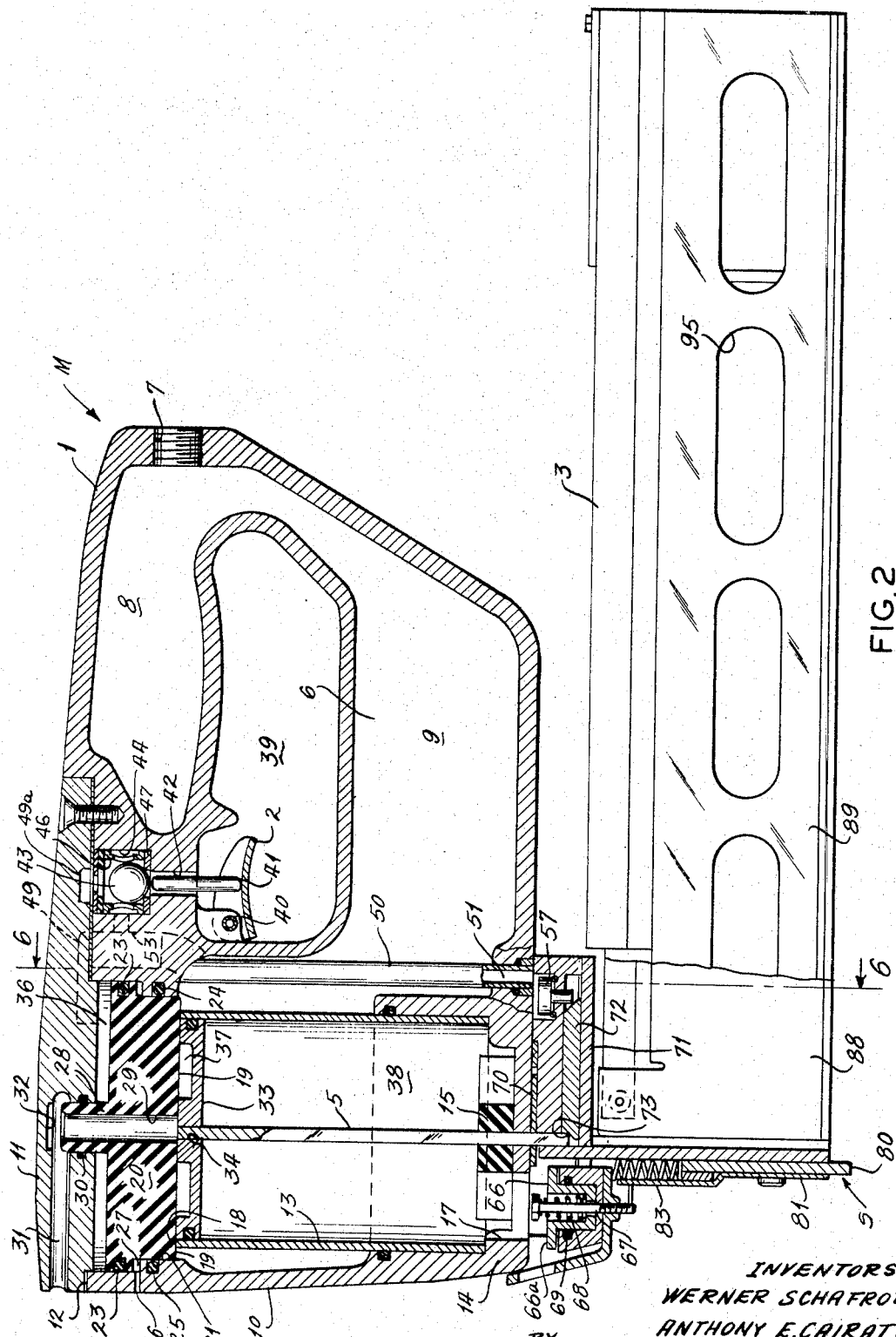

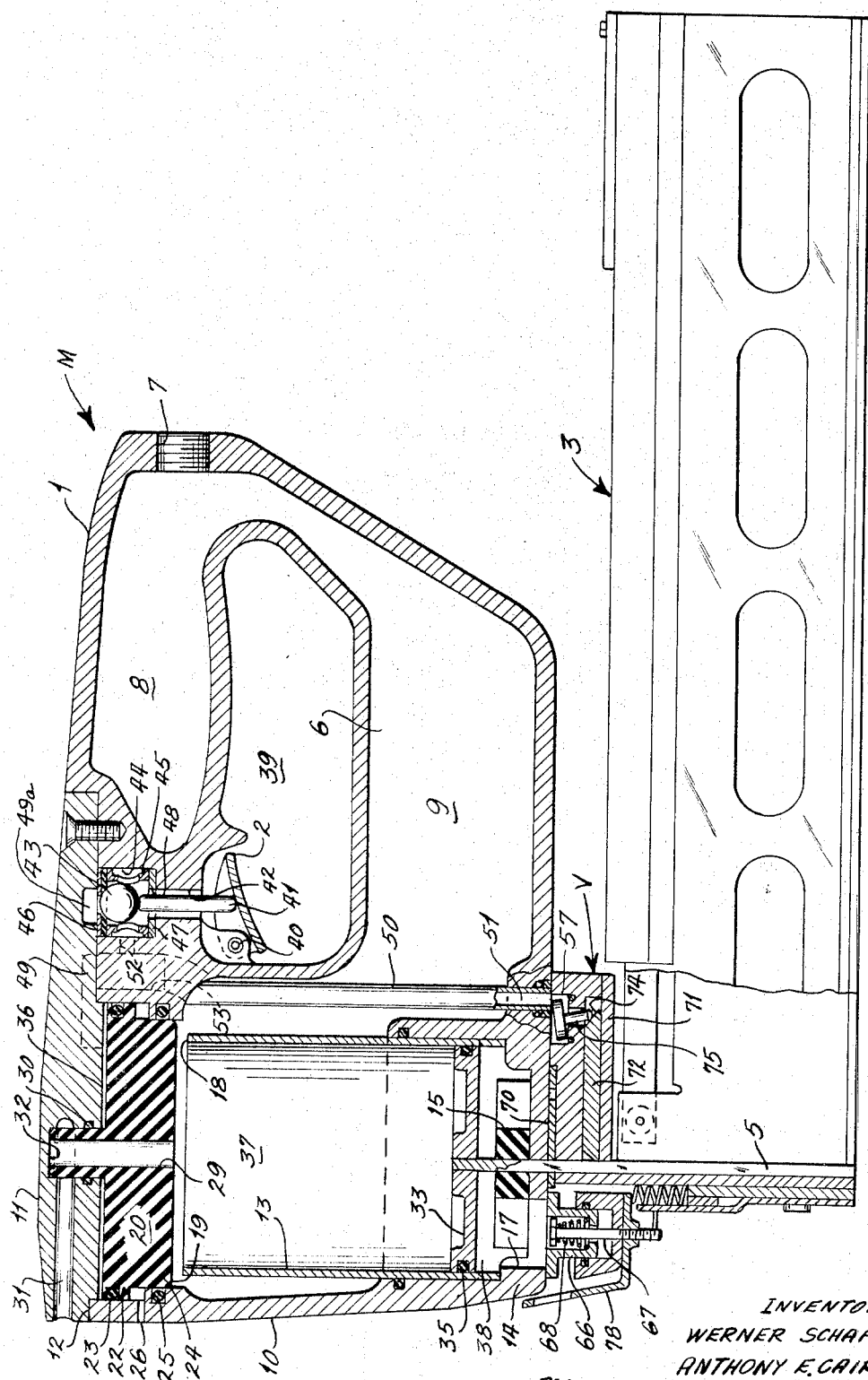

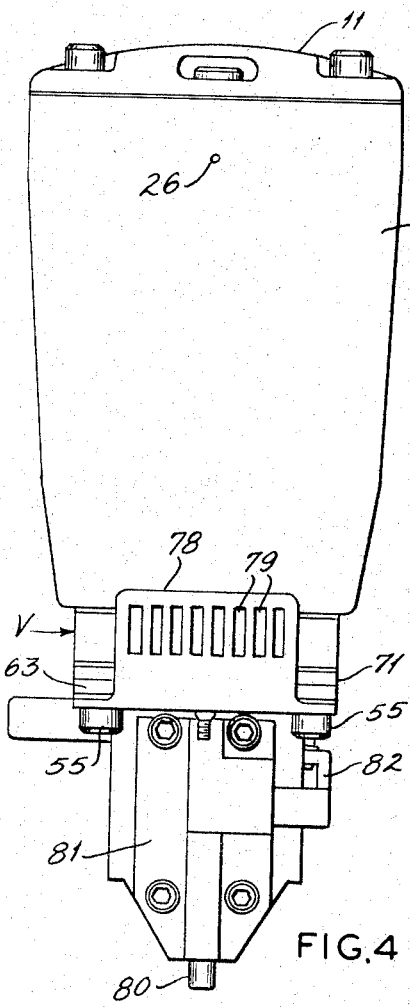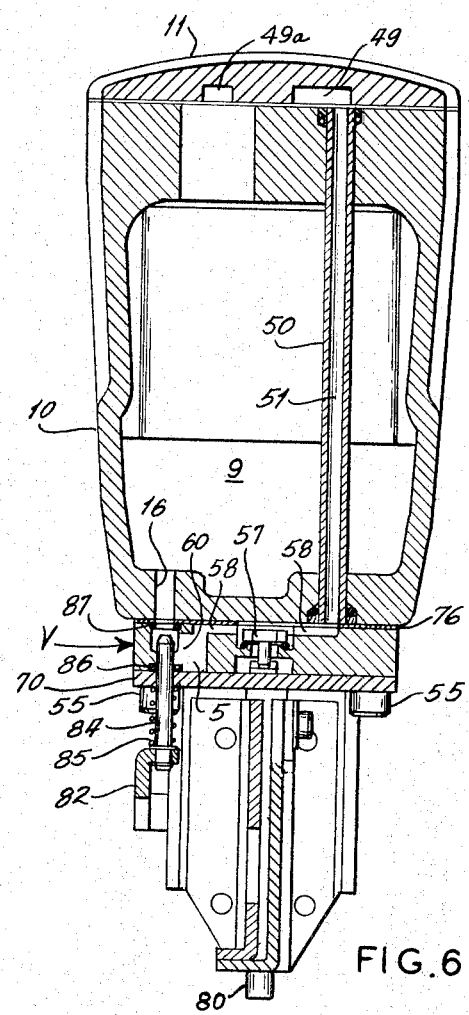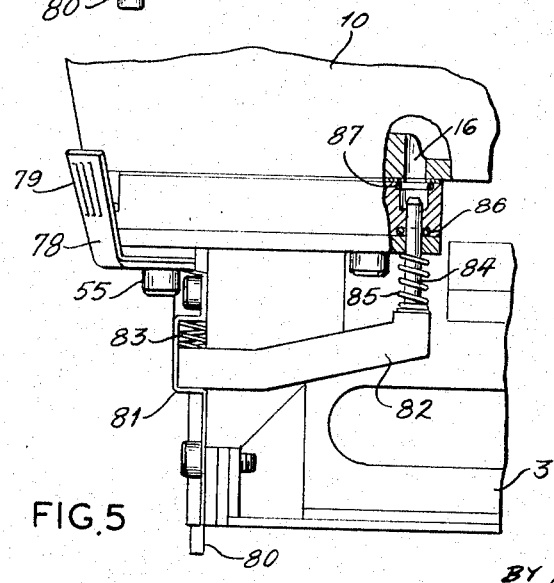

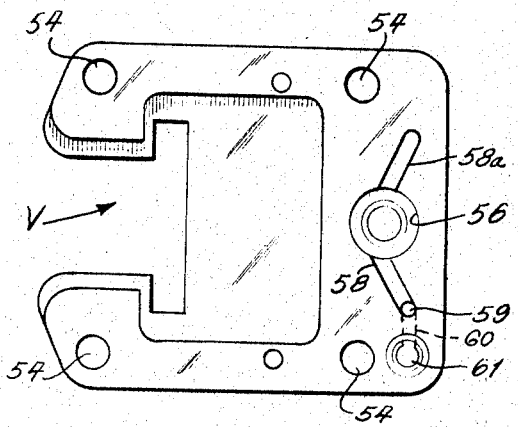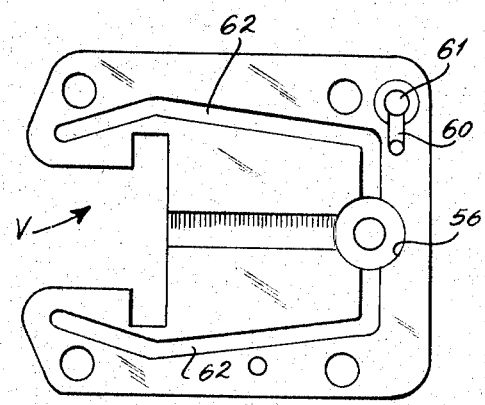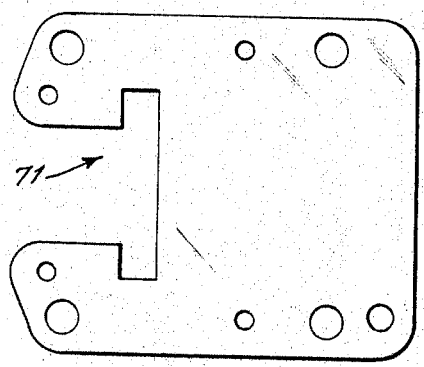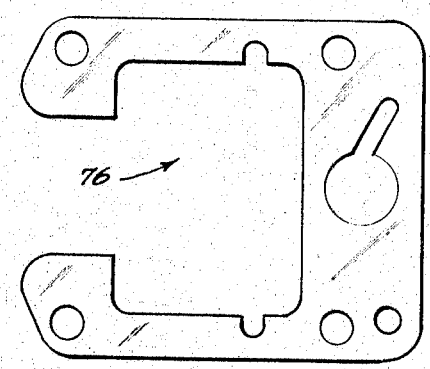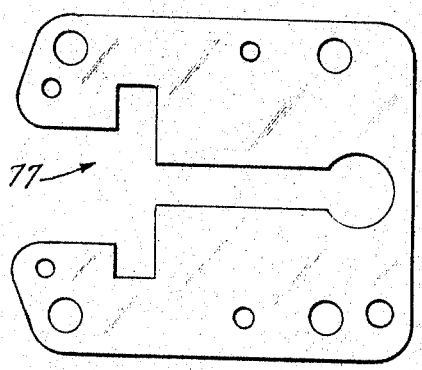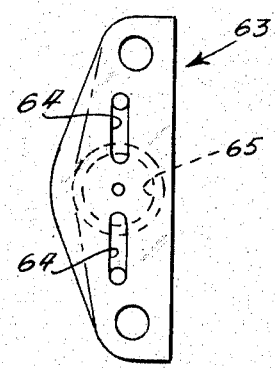

Sept. 19, 1967     W. SCHAFROTH ETAL     3,342,110
NAILING MACHINE
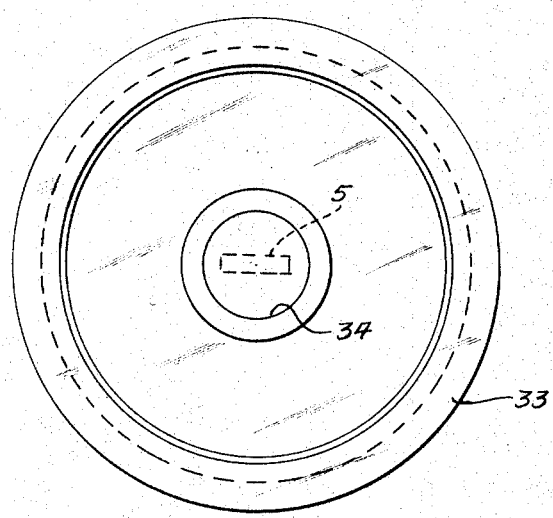
FIG.15
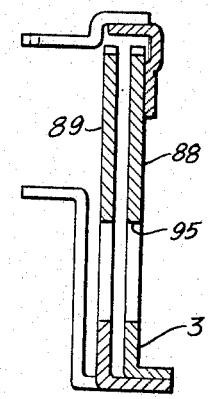
FIG.14
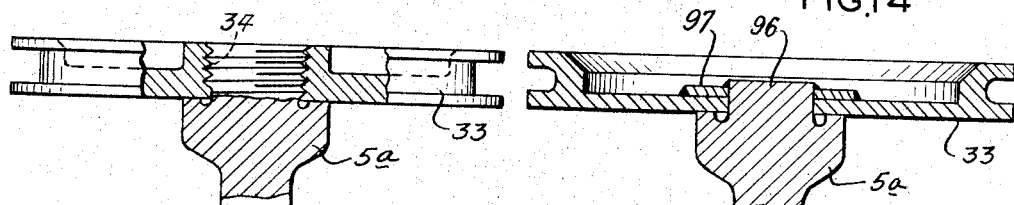
FIG.16
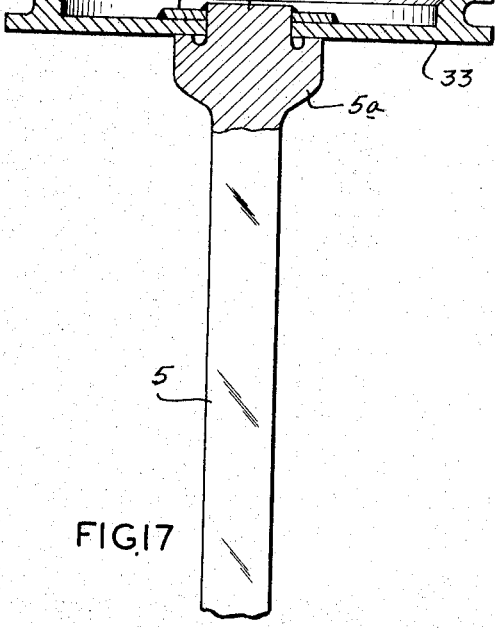
FIG.17
INVENTORS:
WERNER SCHAFROTH
ANTHONY E. CAIRATTI
BY Gravely, Lieder & Woodruff
ATTORNEYS.

INVENTORS
WERNER SCHAFROTH
ANTHONY E. CAIRATTI

United States Patent Office 3,342,110
Patented Sept. 19, 1967

3,342,110
NAILING MACHINE
Werner Schafroth, P.O. Box 247, Herrin, Ill. 62948,
and Anthony E. Cairatti, Herrin, Ill.; said Cairatti assignor to said Schafroth
Filed Sept. 25, 1964, Ser. No. 399,152
1 Claim. (Cl. 91—454)

This invention relates to an improved nailing machine, and in particular, to a power actuated nailing machine whose head is relatively short in height. Such a machine is used to drive nails, but can also be used to drive heavy and long staples as well as corrugated fasteners.

Power actuated nailing machines have been used in the past, but such machines have been relatively tall with a differential piston and other numerous parts therein.

One of the principal objects of the present invention is to provide a power actuated nailing machine with a lightweight piston therein, said machine having a relatively short head. Another object is to provide a construction having a thin piston to which air is applied to move the piston up and down. Another object is to provide a nailing machine that can drive long nails, about 2.5 inches long, into the hardest wood, including wood which is much harder than oak. Another object is to provide a nailing machine which is positively acting and which is made from relatively few parts which are designed to be free from trouble. Another object is to provide a novel safety device on said nailing gun to prevent its operation unless the machine is in contact with a surface into which a fastener is being driven. Another object is to provide a novel magazine in which the spring is positioned on the side thereof, the other side panel thereof having holes therein so that the remaining fasteners can be viewed.

These and other objects and advantages will become apparent hereinafter.

The present invention is embodied in a nailing machine having a relatively light piston therein, storage means for compressed air, a relatively short head, a valve block assembly, a novel magazine, and a safety device to prevent functioning of the machine unless the machine is in contact with a surface.

Figure 19:
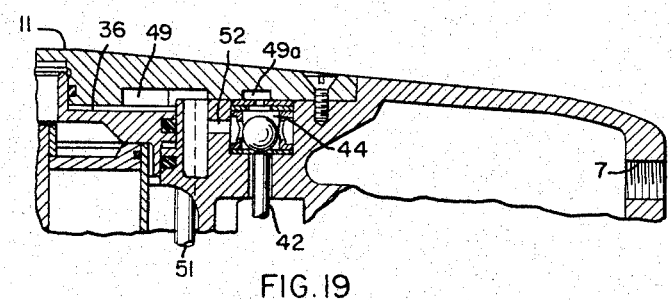
Figure 20:
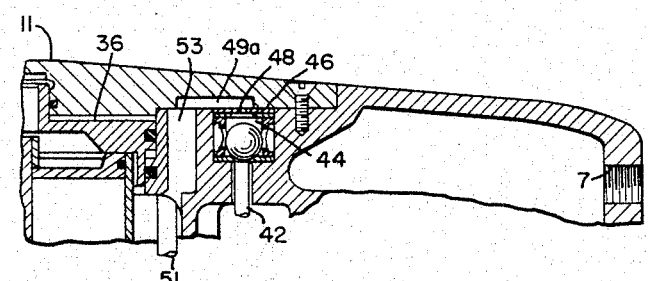

The invention also consists in the parts and in the arrangement and combinations of parts hereinafter described and claimed. In the accompanying drawings which form part of this specification and wherein like numerals and symbols refer to like parts wherever they occur:

FIG. 1 is a top plan view of a nailing machine embodying the present invention,

FIG. 2 is a longitudinal cross-sectional view of said machine along the line 2—2 of FIG. 1, showing the driving piston in its upper position and the main valve assembly and trigger in their lower positions, FIG. 3 is a fragmentary sectional view similar to that shown in FIG. 2, except that the main piston is in its downward movement and the main valve assembly and trigger are in their upper positions and the feed valve is shown in its rightward or rearward position, FIG. 4 is a front elevational view of said machine, FIG. 5 is a fragmentary side view of the safety valve portion, FIG. 6 is a vertical cross-sectional view taken along the line 6—6 of FIG. 2, FIG. 7 is a top plan view, without the cap or main valve assembly or main piston, FIG. 8 is a top plan view of the valve block, FIG. 9 is a bottom view thereof, FIG. 10 is a top plan view of the valve block plate, FIG. 11 is a top plan view of the valve block upper gasket, FIG. 12 is a top plan view of the valve block lower gasket, FIG. 13 is a top plan view of the valve block, FIG. 14 is a cross-sectional view through the magazine and line 14—14 in FIG. 1, FIG. 15 is a top plan view of the main piston with the attached driver blade, FIG. 16 is a side elevational view of the driver blade, partly in section, showing the lightweight connection between the driver blade and main piston, FIG. 17 is a side elevational view, partly in section, of a modified form of lightweight piston and driving blade assembly, FIG. 18 is a top plan view of the machine showing various passages in dotted lines, FIG. 19 is a fragmentary sectional view taken along the line 19—19 of FIG. 18, and FIG. 20 is a fragmentary sectional view taken along the line 20—20 of FIG. 18.

Referring now to the drawings in detail, it will be seen that the embodiment of the invention which has been illustrated comprises a nailing machine M having a head H and safety means S, the machine M having a handle 1 and trigger means 2, and a magazine 3 for feeding nails 4, or other fastening means, to the head H in order to be driven by a power actuated driving blade 5. The handle 1 is hollow to form a storage reservoir 6 with an opening 7 for receiving a source of compressed air. The reservoir 6 has an upper hand grasping portion 8 and a lower portion 9 to provide for sufficient compressed air storage.

The head H of the nailing machine M has an upstanding casing 10 with a cap 11 thereon closing the top portion 12 of the casing 10, an inner cylinder 13 sealably secured to the casing 10 which has a bottom portion 14 with a bumper 15 therein with a large exhaust port 17 adjacent thereto. The casing also has a small safety hole 16 therein (FIGS. 5 and 6). The top 18 of the inner cylinder 13 is spaced below the lower surface of the cap 11. A main valve assembly 20 is slidably mounted in this limited vertical space in sliding relation with the inner surface 21 of said casing 10 and is adapted to seat on the top 18 of the inner cylinder 13. An annular area 19 is provided on the underside of the assembly outwardly of the cylinder 13.

The main valve assembly 20 is preferably made from nylon and has a large diametered upper portion 22 with sealing means 23, such as an O ring, in its outer peripheral edge, and a smaller diametered lower portion 24 sealed by an O ring 25 mounted in the casing 10, which is provided with small air escape holes 26 leading to the atmosphere from the space 27 between the O rings 23 and 25. The main valve assembly 20 has an upper flange 28 with an opening 29 extending completely through the height of the main valve assembly 20. The upper flange 28 or exhaust valve tube 28 extends upwardly in an opening in the cap 11 with an O ring 30 therearound so as to connect the opening 29 with an opening 31 in the cap 11. The cap 11 is also provided with a seat 32 for closing the opening 29 in the valve 20.

The main piston 33 is very simple and is made of thin metal so as to be light in weight. The main piston 33 has a central threaded opening 34 for receiving the upper threaded end of the driving blade 5, and sealing means 35, such as an O ring, in its outer peripheral margin. Thus, an upper chamber 36 is formed between the cap 11 and main valve assembly 20 and a piston chamber 37 between said assembly 20 and main piston 33 and a lower chamber 38 beneath said piston 33. The flat blade 5 has threads on its upper portion so that it is simply screwed into the threaded opening 34 until the shoulders 5a abut against the underside of the piston 33, with the remainder of the threaded opening then being filled with silver solder to make it air tight (FIGS. 15 and 16).

The handle 1 is provided with a handhole 39 and a pivot pin 40 on which is mounted the trigger 2 for actuating the nailing machine M. A plunger 41 contacts the trigger 2 and moves vertically within an enlarged opening 42 in the casing 10 in alignment with a valve ball 43 positioned within a recess 44 and held by a valve collar 45, an upper washer 46 and lower washer 47 each having an opening 48 therein. The recess 44 connects with a passage 49a in the cap 11. The passage 49a connects with a passage 53 which connects with the reservoir 6. A feeder tube 50 with a passage 51 therein connects a passage 49 in the cap 11 with a valve block V. The passage 49 connects the upper chamber 36 to the passage 51. The valve collar 45 has an opening leading to a passage 52 which connects with the passage 52. The opening 38 in the upper washer 46 connects with a passage 49a in the cap 11 which connects with a passage 53 which connects with a reservoir 6. The passage 51 in the feeder tube 50 connects with a passage 49 and with the chamber 36. If the cap 11 were in position in FIG. 7, the passage 49a would connect the opening 48 at the top of the recess 44 with the passage 53.

The valve block V, best shown in FIGS. 2, 8 and 9, contains four holes 54 for receiving bolts 55 which secure it to the casing 10. The valve block V has a large rear upper hole 56 with a poppet valve 57 therein. Passages 58 and 58a extend from the hole 56, one passage 58 to a vertical hole 59 having a lateral passage 60 which extends into a vertical safety hole 61, the other passage 58a connects the hole 56 with the passage 51 in the feeder tube 50. The bottom of the valve block V has two passages 62 (FIG. 9) extending forwardly to a valve block piston feeder 63 having feeder passages 64 (FIG. 13) therein leading to an opening 65 which slidably receives a relief valve 66. The relief valve 66 is provided with a valve retainer plate 67 with a spring 68 therearound. An O ring 69 circumscribes the relief valve 66. The valve block V also has a guide plate 70 in its upper portion for guiding the driving blade 5. A plate 71 is positioned below the valve block V. A valve recovery bar 72 is slidably mounted in the valve block V and has a forward sloping surface 73 adapted to be contacted by the driving blade 5, and a rear sloping surface 74 adapted to contact the stem 75 of the poppet valve 57. An upper gasket 76 (FIG. 11) and a lower gasket 77 (FIG. 12) are applied in sealing relation to the top and bottom of the valve block V.

The relief valve 66 is adapted to move within the valve block piston feeder 63 and to close the exhaust opening 17 in the bottom of the casing 10. To protect these parts, a valve shield 78 is provided and has holes 79 in its forward portion.

The nailing machine M is provided with a trip safety valve S having a foot 80 which extends vertically within a housing 81 on the front of the machine to a safety valve arm 82. A front spring 83 is provided to bias the foot 80 downwardly. The arm 82 has a shaft 84 with a spring 85 therearound at its rear portion, said shaft 84 extending upwardly into the opening 61 in the valve block V, there being a bottom sealing ring 86 and a top sealing ring 87 around the safety hole 61 which extends upwardly into the safety hole 16 leading to the reservoir 9. In the inoperative position, the front spring 83 biases the foot 80 of the trip safety valve S downwardly so that it extends about one-fourth of an inch beneath the bottom of the machine M.

The magazine 3 is made from a left shell 88, a right shell 89, with a connector 90 therebetween. The right shell 89 is provided with upper flanges 91 between which the pusher 92 is free to slide forwardly under the action of a coil spring 93 mounted on a pin 94 in said pusher 92. The forward end of the spring 93 is secured to the forward portion of the magazine 3 immediately rearwardly of the driving blade 5. The right magazine shell 89 is provided with openings 95 so that the operator can see how many nails or fasteners remain in the magazine 3.

Placing the pusher 92 on the side of the magazine 3 instead of on the top thereof makes it more convenient for the operator to pull the pusher 92 rearwardly when reloading and prevents the pusher from being limited in its forward movement by the handle 1, since the pusher 92 is entirely below the top plane of the magazine 3.

The modified form of lightweight piston and driving blade shown in FIG. 17 comprises a driving blade 5 having shoulders 5a which abut against the lower surface of the thin piston 33. The top portion 96 of the driving blade 5 extends upwardly through an opening 34 in the piston 33 and the two parts are secured together by a circular retainer plate 97 having a rectangular slot therein for receiving said top portion 96, there being welds around the edge of the plate 97 and the top portion 96 so that a unitary leak proof piston-driving blade assembly is thus formed. The pistons 33 shown in FIGS. 15–17 are leak proof and preferably are made of steel having a very thin section, so as to be as light in weight as possible.

The operation of the nailing machine shown in the drawings is believed to be apparent from the foregoing description. With the nailing machine M suitably attached to a source of compressed air at about 80 pounds per square inch and with the magazine 3 loaded with nails, the parts are in the inoperative position shown in FIG. 2. In this position, compressed air from the reservoir 6 is free to enter the annular area 19 and passages 53 and 49a above the valve ball 43 and then into the recess 44, the passages 52 and 49 and the chamber 36, and is free to enter feeder tube 50. The pressure within the chamber 38 within the inner cylinder 13 beneath the piston 33 is at atmosphere, since in this position the large exhaust port 17 at the bottom of the cylinder 13 is open and the parts are in the position shown in FIG. 2. The pressure in the passage 51 of the feeder tube 50 keeps the poppet valve 57 down and the valve recovery bar 72 in its leftward position.

The operation will be explained after the safety device has first been operated. The operation of the safety device will then be explained. In operation, when the trigger 2 is actuated, or pivoted upwardly, the pin or plunger 41 lifts the normally closed valve ball 43, thereby exhausting the chamber 36 through the passages 49 and 52 and around the plunger 41, and sealing the opening in the upper washer 46 and cutting off all incoming air to the chamber 36 which would otherwise move through passages 52 and 49. The exhaust passage 42 surrounding the plunger 41 exhausts the air from the chamber 36 above the nylon piston or main valve assembly 20. At this time, the pressure in the reservoir 6, especially that portion surrounding the inner cylinder 13, acts on the lower peripheral edge 19 of the valve 20 outwardly of the cylinder 13 and causes the valve 20 to move up, and in so doing, the stem or upper flange 28 moves up against the seat 32 in the upper cap 11 to close the exhaust passage 29. When the pressure in the upper valve chamber 36 is less than the pressure on the underside of the main valve assembly 20, said valve 20 moves upwardly and unseats itself from the top edge 18 of the cylinder 13 to allow air pressure from the reservoir 6 to act on the top of the main piston 33. This forces the piston 33 downwardly with great force thereby driving the blade 5 downwardly to drive a nail or a corrugated fastener or other fastening means. As the main piston 33 begins its movement downwardly, the driving blade 5 attached thereto contacts the forward surface 73 of the recovery bar or slide block 72 and moves the recovery bar or slide block 72 rearwardly, or to the right as shown in FIGS. 2 and 3. The rear surface 74 of the slide block 72 tilts the poppet valve 57 and the parts remain in this position as the driving blade 5 moves downwardly and until the trigger 2 is released.

When the poppet valve 57 is tilted or raised so as to open pressure from the feeder tube 50 passes into and through the upper hole 56 to the passages 62, the passages 64 in the valve block piston feeder 63, and beneath the relief valve 66 thereby moving it upwardly against the casing 10 so as to close the large exhaust port 17 to the atmosphere. However, this does not occur until the driving blade has completed its downward movement due to the size of the passages and the sequence of operations.

The return of the main piston 33 to its upper position is as follows. When the trigger 2 is released, the plunger 41 moves downwardly and the ball 43 moves downwardly seating against the opening 48 in lower washer 47 and closing the exhaust passage 42 around the plunger 41. In so doing, the ball 43 moves away from the opening 48 in the upper washer 46 to allow the re-admission of air to the chamber 36 through the passage 49, thereby forcing the valve 20 down, because of its larger diameter on its top, to re-seat on the top edge 18 of the cylinder 13. At the same time as the nylon valve 20 is being forced downwardly, the air between the O rings 23 and 25 is being expelled through one or more escape holes 26, and pressure is also being directed down through the feeder tube 50 which fits into an opening 56, said pressure being directed through the passage 51 to the poppet valve 57 which fits in the opening 56, through the passages 62, which connect with the passages 64, in the valve block feeder piston 63, which lead to the chamber under the relief valve 66. When air pressure enters this chamber, the relief valve 66 is forced upwardly so that the top flange 66a closes against the bottom of the casing 10 to close the large opening 17 therein. When the relief valve 66 closes the hole 17, part of the air pressure keeps the valve 66 closed and part passes upwardly by the valve retainer rod 67, around which the valve 66 loosely fits to allow air pressure to move through the hole 17 in the bottom of the casing 10, upwardly through the bumper 15 and to the chamber 38 under the piston 33, thereby moving said piston 33 upwardly in the cylinder 13 to its full upper position as shown in FIGURE 2. The air above the piston 33 is forced out through the openings 29 and 31 to the atmosphere.

In the upper position as shown in FIG. 2, the driving blade 5 releases the slide block 72 and allows said block 72 to move forwardly (leftwardly as shown in FIG. 2) thereby closing the poppet valve 57 which prevents further air from coming in under the relief valve 66 and the main piston 33. The pressure from the feeder tube 50 upon the poppet valve 57, which contacts the rear sloping surface 74 of the valve recovery bar 72, and the pressure acting on said surface 74 forces the bar 72 leftwardly when the front portion thereof is free to move under the blade 5. The poppet valve 57 is then closed and the pressure in the reservoir 6 keeps it closed. Thus, friction and the driving blade 5 resting on the next nail to be driven keeps the piston 33 in its upper position.

The pressure under the piston 33 is a holding pressure far less than the operating pressure. When the poppet valve 57 seats, the pressure drops and the relief valve 66 moves downwardly because of the force exerted by the spring 68, which opens the large exhaust port 17 thereby bringing the chamber 38 beneath the piston 33 to atmosphere. The piston 33 and driving blade 5 remain in their upper position due to the frictional forces between the parts, and by the slide block 72 which is being held under the driving blade 5 by air pressure on the upper side of the poppet valve 57. The opening 17 beneath the piston 33 is very large that air can easily escape as the piston 33 is driven downwardly at a rapid rate. The lightness of the piston 33, the driving blade 5, and the weightless connection therebetween, is such that 2½ inch nail requires only a pressure of 80 p.s.i.

The safety device S will now be described. Its purpose is to prevent nails from being driven unless the machine is in contact with a surface into which a nail can be driven. This prevents the machine M from shooting nails at a high velocity through the air, such as might occur if a workman accidentally presses the trigger 2 when the machine is being carried or is not in contact with a wood surface, etc. Any nail shot from the machine into the air would be dangerous since it might cause injury to persons or damage to property either upon direct hit or ricochet.

The safety device S also has another advantage in operation. If the operator wishes, he may press the trigger 2 while the machine is being carried out of contact with any surface. Because of the safety device S, no nail will be driven. However, as soon as the operator depresses the foot 80 on the safety device S, a nail will be driven. Thus, an operator who depresses the trigger 2 when the machine is not in contact with anything can drive a nail when he touches the machine against a surface. This type of operation might be advantageous in certain situations. After a nail is driven, the trigger 2 must be released to permit the valve ball 43 to reseat thereby recycling the machine.

When the foot 80 of the trip safety device S is down, as shown in FIG. 2, the machine M will not operate when the trigger 2 is depressed. In the safety position, in which the machine will not operate, there is an open connection between the reservoir 6, the safety hole 16, the upper enlarged portion of the vertical safety hole 61, the lateral passage 60, the hole 59, the passage 58, the feeder tube passage 51, and the reservoir 6. Under such conditions, if the trigger 2 is depressed, nothing happens since the reservoir pressure is directed not only as explained in the operation of the machine, but also from the feeder tube passage 51 back into the reservoir 6 through the safety hole 16. In other words, in the safety position, depressing the trigger does not produce a pressure differential to move the main valve assembly 20 up and the main piston 33 down.

When the foot 80 of the trip safety device S is up, as shown in FIG. 3, the arm 82 and shaft 84 are raised so that the shaft 84 moves up to seat against the top sealing ring 87, thereby closing the connection between the safety hole 16 and the lateral passage 60. Thus, the feeder tube passage 51 is no longer in connection with the chamber 36 above the main valve 20. The machine M is therefore free to operate as previously described.

While the invention has been called a nailing machine, the word nail is used in its broadest sense and includes different kinds of fasteners including corrugated fasteners or any other kind which can be driven. With corrugated fasteners, the same basic parts are used but the cross-sectional shape of the driving blade 5 and the rectangular opening in the guide plate 70 (FIG. 7) may, under some conditions for some kinds of fasteners, be changed. Similarly, the magazine 3 may be changed to accommodate fasteners of different shapes, and if desired, fasteners in roll form might even be fed to the machine.

This invention is intended to cover all changes and modifications of the example of the invention herein chosen for purposes of the disclosure, which do not constitute departures from the spirit and scope of the invention.

What is claimed is:

In a driving machine having a casing with a reservoir and an inner cylinder therein, a piston slidably mounted in said inner cylinder, said piston having a driving blade connected thereto, a main valve assembly slidably mounted in said casing above said inner cylinder for opening and closing the top of said inner cylinder, a chamber above the main valve assembly normally exposed to pressure from said reservoir and closed to atmosphere, a valve block connected to said casing below said inner cylinder, said driving blade adapted to actuate a valve positioned within said valve block, a feeder tube connecting said chamber with said valve in said valve block, a trigger which when moved toward said casing causes said piston to be driven downward, said casing having an exhaust port therein for exhausting said inner cylinder beneath said piston, said exhaust port being provided with a relief valve for closing said exhaust port to atmosphere, said relief valve closing said exhaust port when said driving blade has completed its downward movement due to the size of the passage within said valve block, said piston remaining in its downward position until said trigger is released, said relief valve being adapted to close said exhaust port and being provided with means therein for allowing pressure to enter said cylinder beneath said piston for returning said piston to its upper position, the release of said trigger allowing pressure from said reservoir to enter said chamber to move said main valve assembly downward to close the top of the inner cylinder and to enter said feeder tube and valve block to close said exhaust port and supply pressure from said reservoir through said exhaust port to return said piston to its upper position.

References Cited
UNITED STATES PATENTS

| | | | |
|---|---|---|---|
| 2,979,725 | 4/1961 | Wandel et al. | 227—130 |
| 3,010,430 | 11/1961 | Allen et al. | 173—169 |
| 3,067,724 | 12/1962 | Jenny et al. | 173—169 |
| 3,086,207 | 4/1963 | Lingle et al. | 227—130 |
| 3,194,324 | 7/1965 | Langas | 173—169 |

MARTIN P. SCHWADRON, *Primary Examiner.*

B. L. ADAMS, *Assistant Examiner.*